United States Patent [19]

Radlmann et al.

[11] 3,875,127

[45] Apr. 1, 1975

[54] ACRYLONITRILE POLYMERS WITH ANTI-STATIC PROPERTIES

[75] Inventors: Eduard Radlmann; Gunther Nischk, both of Dormagen, Germany

[73] Assignee: Bayer Aktiengesellschaft, Leverkusen, Germany

[22] Filed: Apr. 13, 1973

[21] Appl. No.: 350,959

[30] Foreign Application Priority Data
Apr. 14, 1972 Germany.............................. 2217974

[52] U.S. Cl....260/85.5 R, 260/32.6 N, 260/45.85 N, 260/45.85 P, 260/45.9 P, 260/45.95 R, 260/45.95 C, 260/88.7 D, 260/410, 260/465, 260/469, 260/488, 260/501.21, 260/509, 260/512, 260/DIG. 15, 260/DIG. 16, 260/DIG. 19
[51] Int. Cl........................... C08f 3/76, C08f 45/58

[58] Field of Search..... 260/85.5 R, 85.5 D, 88.7 R, 260/88.7 D, DIG. 15, DIG. 16, DIG. 19, 45.85 N, 45.85 P, 45.9 P, 45.95 R, 45.95 C, 509

[56] References Cited
UNITED STATES PATENTS
3,737,420   6/1973   Brokmeier et al............. 260/85.5 R
3,743,685   7/1973   Grosjean et al.............. 260/DIG. 15

*Primary Examiner*—Harry Wong, Jr.
*Attorney, Agent, or Firm*—Plumley & Tyner

[57] ABSTRACT

The invention relates to acrylonitrile polymers or copolymers containing as an anti-static agent from 1 to 20 percent by weight based on the mixture as a whole of polyalkylene oxide derivatives with terminal sulphonate groups attached through alkylphenyl ether groups.

6 Claims, No Drawings

ACRYLONITRILE POLYMERS WITH ANTI-STATIC PROPERTIES

This invention relates to acrylonitrile polymers with reduced surface resistance.

Since the surface resistance of shaped articles, especially fibres, of polyacrylonitrile or acrylonitrile copolymers is greater than $10^{12}$ Ohms, the potential commercial applications of materials of this kind are limited on account of the extremely troublesome electrical charge.

There is an extensive literature on tests to provide acrylonitrile-based polymers with an anti-static finish, such as applying anti-statically active substances to the surface of the shaped articles, introducing suitable substrates into the melt or solution of the polymers, followed by forming, or copolymerising the acrylonitrile with anti-statically active comonomers, in such a way that their surface resistance falls to values below $10^{12}$ Ohms.

A permanent anti-static effect can seldom be obtained by applying suitable compounds because shaped articles are generally exposed to mechanical or solvolytic influences which remove the surface coating. Acrylonitrile copolymers with comonomers which reduce surface resistance should have the most favourable antistatic effect because the active constituents are firmly anchored in the polymer chain. In this case, however, considerable difficulties are encountered during polymerisation in the case of conventional systems.

No problems are involved in adding anti-statically active substrates before the forming stage. The requirements which substances of this kind have to satisfy include high compatibility with the polymer, resistance to temperature stressing, resistance to evaporation, hydrolytic influences or washing out with water or organic solvents.

Conventional anit-static additives are based on compounds from such classes as ureas, dithiocarbonates, phosphoric acid amides, aminocarboxylic acid amides, polyethylene oxides, and oxalkylated aliphatic or aromatic alcohols with terminal sulphonate groups which are introduced through aliphatic ether groups with sultones or ω-halogen alkane sulphonates.

It has now been found that polyalkylene oxide derivatives with terminal sulphonate groups attached through alkylphenyl ether groups show outstanding anti-static activity as additives to acrylonitrile polymers. The reduction which these additives produce in electrical surface resistance is also obtained in some other synthetic polymers.

According to the invention there is provided a compound corresponding to the general formula (I)

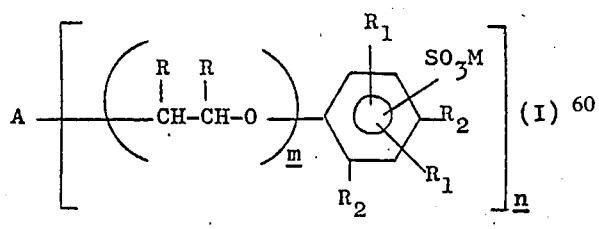

in which:

$m$ is an integer of from 1 to 150;

M represents a member selected from the group consisting of an alkali metal, alkaline earth metal, an ammonium radical and an alkylammonium radical;

R represents hydrogen or a methyl radical;

$R_1$ represents a member selected from the group consisting of, hydrogen, a lower alkyl radical with from 1 to 6 carbon atoms, fluorine, chlorine, bromine and iodine;

$R_2$ represents a member selected from the group consisting of hydrogen, $-NH_2$, $-NO_2$, $-CN$, $-CF_3$, $-Cl$ and

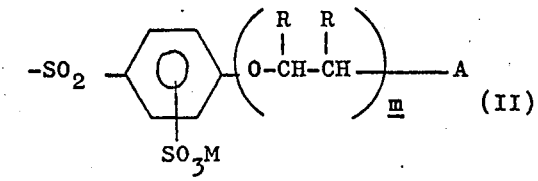

in which R, M and $m$ are defined above; and

A represents a radical selected from the group consisting of

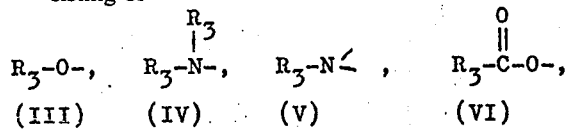

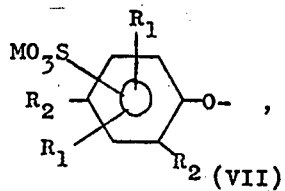

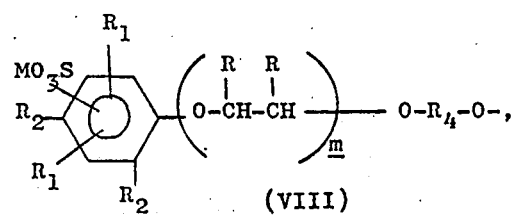

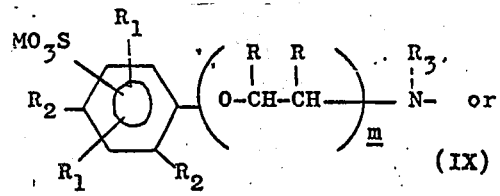

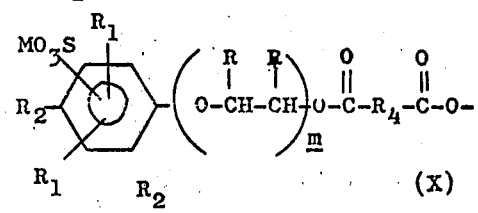

in which R, $R_1$, $R_2$, M and $m$ are as defined above, $R_3$ represents a radical selected from the group consisting of an alkyl radical with from 1 to 30 carbon atoms, an aryl, alkylaryl and arylalkyl radical, and $R_4$ represents a number selected from an alkylene radical with from 1 to 30 carbon atoms and an arylene radical; and $n$ represents the number 1 or 2.

According to the invention, there is also provided an acrylonitrile polymer or copolymer containing, as an antistatic agent, from 1 to 20 percent by weight, based on the mixture as a whole, of at least one compound corresponding to formula (I).

The acrylonitrile polymers according to the invention are obtained, preferably in the form of filaments, by adding to spinnable solutions or melts of these polymers from 1 to 20 percent by weight, based on the total solids content, of compounds corresponding to the general formula (I):

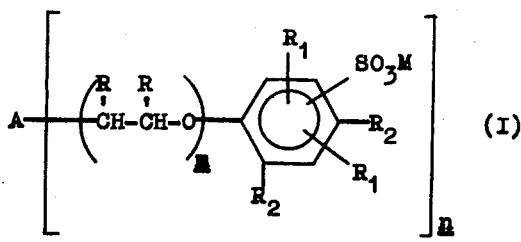

(I)

in which A, R, $R_1$, $R_2$, M, $m$ and $n$ are as defined above, and spinning the solution or melt.

The novel anti-static agents added in accordance with the invention are prepared by converting polyether diols of ethylene oxide or propylene oxide or oxalkylation products, preferably with ethylene oxide, propylene oxide or mixtures of the two reacted aliphatic or aromatic alcohols and diols, primary or secondary aliphatic or aromatic amines, mono- or dicarboxylic acids corresponding to the general formula (II):

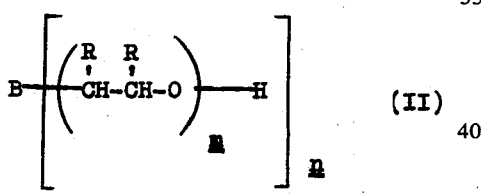

(II)

in which B represents the radicals HO—, $R_3$—O—,

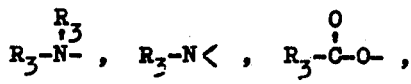

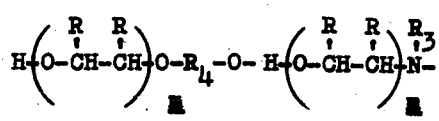

or 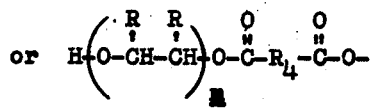

and R, $R_3$, $R_4$, $n$ and $m$ are as defined above, into the corresponding alcoholates in the presence of an inert gas and in the absence of moisture, and reacting the resulting alcoholates at temperatures of from 20° to 150°C, either in the melt or in an inert solvent, with a compound corresponding to the general formula (XI):

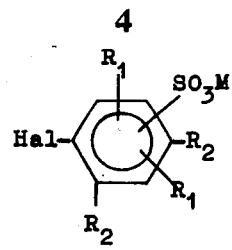

(XI)

in which $R_1$, $R_2$ and M are as defined above, and Hal represents fluorine, chlorine or bromine, accompanied by the elimination of M—Hal.

The types in which $R_1$ represents —$NH_2$ are obtained from the corresponding nitro compounds by catalytic hydrogenation with Raney nickel.

The following are mentioned as examples of oxalkylation products for the production of the new anti-static agents added in accordance with the invention:

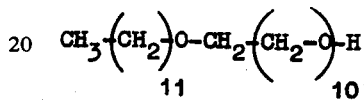

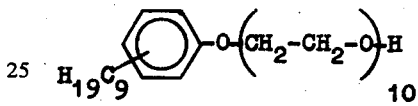

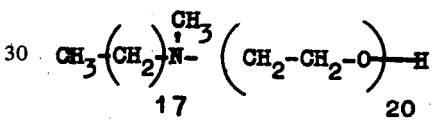

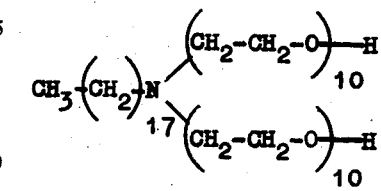

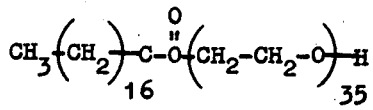

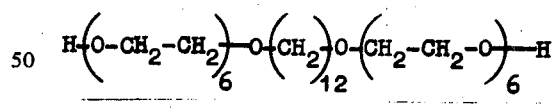

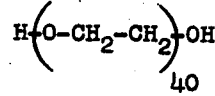

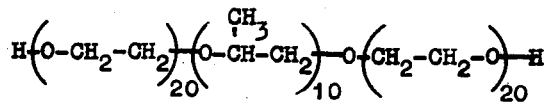

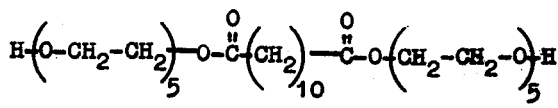

The following are examples of activated halogen compounds for the nucleophilic substitution reaction according to the invention:

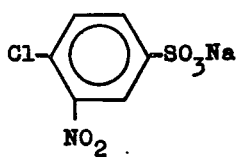 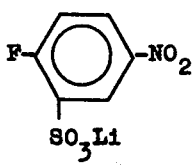

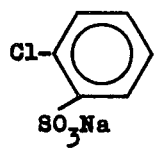

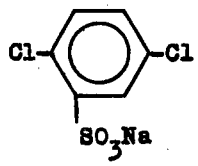

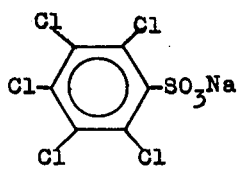 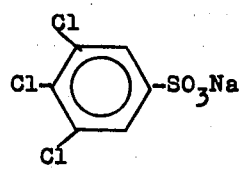

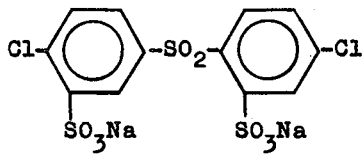

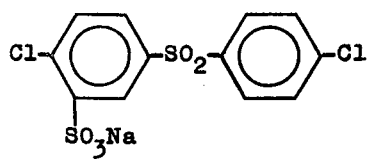

The anti-static agents can be prepared for example as follows:

For conversion into the alcoholate, the corresponding oxalkylation product is either reacted in the melt with an equimolecular quantity of an alkali metal or has a calculated quantity of the alcoholate of a low-boiling alcohol, for example methanol or ethanol, added to it in the absence of moisture and in an inert gas atmosphere, followed by removal of the methanol or ethanol by distillation under reduced pressure. The alcoholate is then reacted either in the melt or in an inert solvent with the activated aromatic halogen compound at temperatures of from 20° to 150°C. In most cases, the reaction is exothermic so that it is advisable to cool the reaction mixture. The reaction is over when the mixture shows a neutral reaction. The alkali metal halide formed during the reaction is then isolated by filtration.

Examples of suitable inert solvents include benzene, dioxan, dimethyl formamide, dimethyl acetamide or N-methyl pyrrolidone. Nitrogen, hydrogen or helium can be used as the inert gas.

The following are mentioned as examples of the anti-static additives according to the invention:

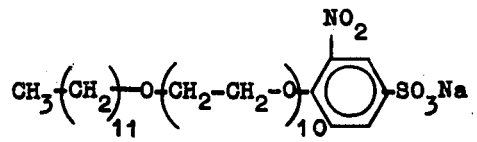

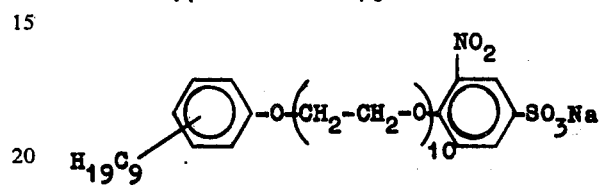

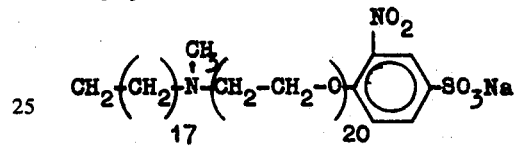

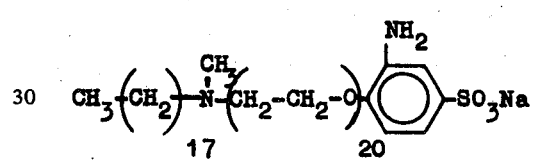

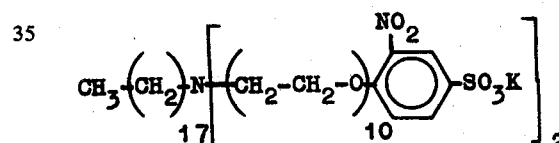

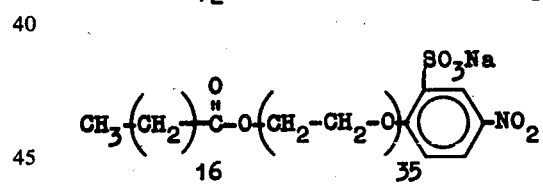

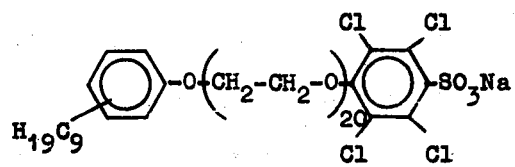

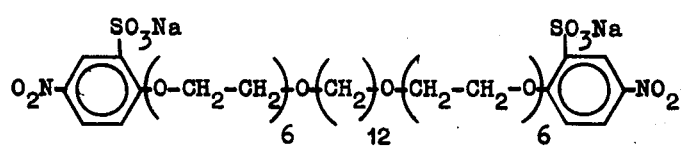

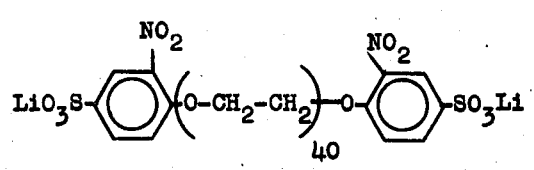

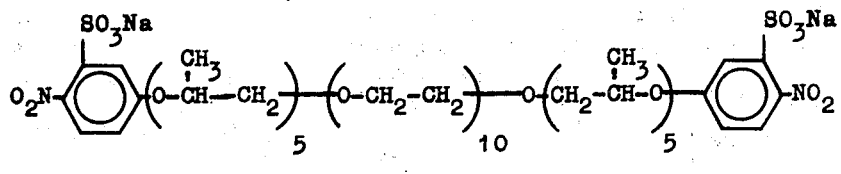

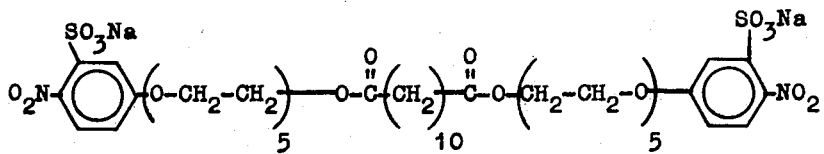

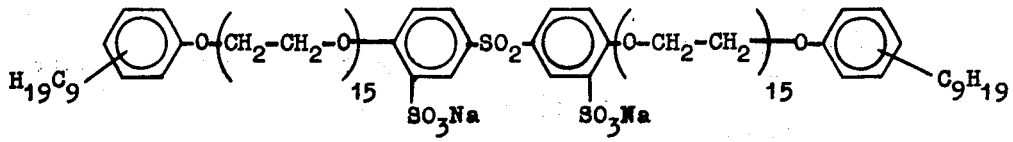

The anti-static compounds according to the invention are compatible with solutions of acrylonitrile polymers, i.e. do not show any disintegration phenomena. Stabilisers, fillers, dyes, pigments, anti-oxidants or the like can also be added without causing disintegration or reduction of the anti-electrostatic effect. The mixtures can readily be processed into filaments or films.

In addition to pure polyacrylonitrile, acrylonitrile polymers suitable for the purposes of the invention include those which contain at least 60 percent by weight of polymerised acrylonitrile and less than 40 percent by weight of other copolymerisable compounds from the group of vinyl and (meth) acryl compounds in copolymerised form. The following are mentioned as examples of copolymerisable compounds: (meth) acrylic acid esters, (meth) acrylic acid amides, vinyl chloride, vinylidene chloride, and also copolymerisable compounds of the kind which bring about an improvement in affinity for acid or basic dyes as described in U.S. Pat. Nos. 2,649,438; 2,837,500; 2,837,501; 2,895,949 and 2,687,938.

Suitable solvents for the polymers include any of the solvents which can be used for polyacrylonitrile, especially dimethyl formamide.

It is considerably advantageous that fibres containing the anti-static agents according to the invention do not undergo any appreciable changes in their surface resistance, even after repeated washing with alkaline washing agents.

In addition to their outstanding anti-static effect, the acrylonitrile polymers according to the invention are distinguished by their high affinity for basic dyes and by their considerably improved water absorption.

In the following production specifications and Examples, parts by weight are to parts by volume as kilograms to litres.

Production of the anti-static additives

A. 5.4 parts by weight of sodium methylate are added to 121.4 parts by weight of an anhydrous ethoxylated stearyl alcohol (average molecular weight $\overline{M}n = 1214$, determined from the OH-number) in 150 parts by volume of absolute methanol. Following removal of the methanol in a water jet pump vacuum at 70°C, the mixture is cooled to room temperature. 26.0 parts by weight of sodium 3-nitro-4-chloro-(1)-benzene sulphonate are then introduced in portions into the melt while dry nitrogen is passed over. The temperature is kept at 65°C by cooling. On completion of the reaction (a sample of the reaction mixture diluted with water gives a pH value of 7) the reaction mixture is dissolved in 144 parts by weight of anhydrous dimethyl formamide containing some active carbon and separated from the sodium chloride by filtration. Following removal of the solvent, a yellow coloured product, wax-like at room temperature, is obtained in a quantitative yield. It has the following constitution:

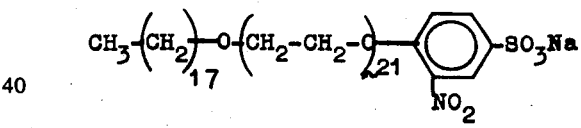

B. 4.6 parts by weight of metallic sodium are dissolved in 208 parts by weight of an oxethylated isononylphenol (average molecular weight $\overline{M}n = 1040$, determined from the OH-number) at 120°C while dry nitrogen is passed over. The alcoholate is then dissolved in 253 parts by weight of anhydrous dimethyl formamide, followed by the addition in portions at room temperature of 51.9 parts by weight of sodium 3-nitro-4-chloro-(1)-benzene sulphonate while dry nitrogen is passed over. The temperature is kept at 70°C by cooling. On completion of the reaction (neutral reaction of the reaction mixture), the mixture is isolated from the sodium chloride by filtration and the solution hydrogenated in an autoclave with 40 parts by weight of Raney nickel at a temperature of 80°C and under a hydrogen pressure of 63 atms. Removal of the Raney nickel and the solvent leaves 245 parts by weight of a substantially colourless product, liquid at room temperature, with the following constitution:

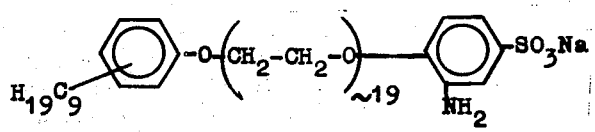

C. 4.6 parts by weight of sodium are added to 206 parts by weight of anhydrous ethoxylated N-methylstearylamine (average molecular weight $\bar{M}n =$ 1030, determined from the OH-number) while dry nitrogen is passed over, followed by stirring at 110°C until a solution is obtained. Following dissolution of the alcoholate in 300 parts by weight of dry dimethyl formamide, 51.9 parts by weight of sodium 3-nitro-6-chloro-(1)-benzene sulphonate are added in portions in such a way that the temperature does not exceed 65°C. When the reaction mixture shows a neutral reaction, the mixture is filtered off from the sodium chloride precipitated and the solvent removed in vacuo, leaving behind, in a quantitative yield, a yellow coloured product, liquid at room temperature, with the following composition:

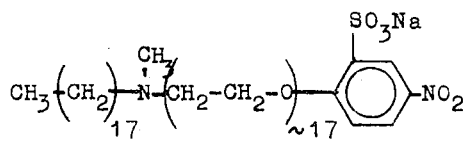

D. 212 parts by weight of a segment polyaddition product with an average molecular weight of $\bar{M}n =$ 1060, obtained by reacting propylene oxide with a polyethylene glycol ($\bar{M}n = 480$), are reacted with 9.2 parts by weight of sodium in 500 parts by volume of absolute dioxan at reflux temperature while nitrogen is passed over. After the evolution of hydrogen has stopped, 103.8 parts by weight of sodium 3-nitro-6-chloro-(1)-benzene sulphonate are added in portions at 70°C. After 5 hours, the reaction mixture shows a neutral reaction. The reaction mixture is then filtered off from the sodium chloride formed and the dioxan distilled off in vacuo, leaving behind in a quantitative yield a pale brown coloured wax-like substance of the following composition.

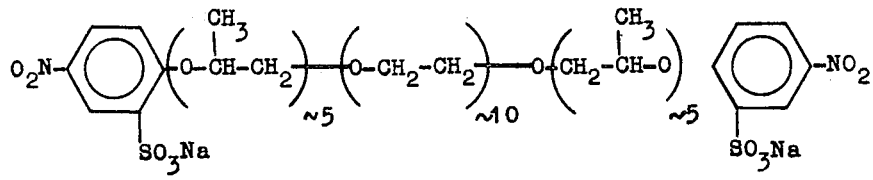

E. 10.8 parts by weight of sodium methylate are added to 150 parts by weight of anhydrous ethoxylated isononylphenol (average molecular weight $\bar{M}n = 750$, determined from the OH-number) in 50 parts by volume of methanol. Following removal of the methanol in vacuo, 98.2 parts by weight of disodium 4,4'-dichlorodiphenyl sulphone-(3,3')-sulphonate are introduced in portions into the melt with cooling at 65° to 70°C while nitrogen is passed over. On completion of the reaction, the reaction mixture is dissolved in 400 parts by volume of dimethyl formamide, filtered off from the sodium chloride and the solvent removed by vacuum distillation, leaving behind in a quantitative yield a pale yellow coloured product, liquid at room temperature, with the following composition:

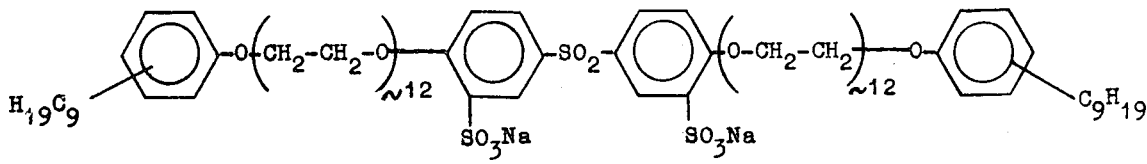

The following Examples are to further illustrate the invention without limiting it.

EXAMPLE 1

The anti-static agents described in A–E are added in different quantities to a 27 percent dimethyl formamide solution of a polyacrylonitrile polymer (K-value according to Fikentscher 85) of 94 parts by weight of acrylonitrile, 5 parts by weight of acrylic acid methyl ester and 1 part by weight of the sodium salt of methallyl sulphonic acid. The solutions are spun in a known manner by the dry-spinning process. After conditioning at 23°C/50 percent relative humidity, the surface resistance of the stretched filaments is measured. After the initial surface resistance has been determined, the filaments are washed at 40°C with a 0.5 percent solution of a standard detergent. The filaments are dried and reconditioned before the subsequent measurement.

The results are set out in Table 1 below and compared with those of filaments of the aforementioned copolymer without any anti-static additions.

Table 1

| Anti-static addition | | Surface resistance at 23°C/ 50% relative humidity [Ω] | | |
|---|---|---|---|---|
| | | After stretching | after 5 washes | after 10 washes |
| none | | $>10^{13}$ | $>10^{13}$ | $>10^{13}$ |
| 7 % by weight of A | | $8·10^{10}$ | $9·10^{10}$ | $1·10^{11}$ |
| 10 % by weight of B | | $3·10^{10}$ | $5·10^{10}$ | $7·10^{10}$ |
| 8 % by weight of C | | $5·10^{10}$ | $7·10^{10}$ | $7·10^{10}$ |
| 5 % by weight of D | | $1·10^{11}$ | $3·10^{11}$ | $3·10^{11}$ |
| 10 % by weight of E | | $4·10^{10}$ | $6·10^{10}$ | $8·10^{10}$ |

EXAMPLE 2

In the same way as described in Example 1, the anti-static agents described in A–E are added in different quantities to a 27 percent dimethyl formamide solution of a polyacrylonitrile copolymer (K-value 80) of 61.3 parts by weight of acrylonitrile, 37 parts by weight of vinylidene chloride and 1.7 parts by weight of the sodium salt of methallyl sulphonic acid. As in Example 1, the solutions are spun into filaments, the surface resistance of the filaments determined and the filaments washed. The results obtained are set out in Table 2:

Table 2

| Anti-static addition | Surface resistance at 23°C/ 50% relative humidity [Ω] | | |
|---|---|---|---|
| | after stretching | after 5 washes | after 10 washes |
| none | >10¹³ | >10¹³ | >10¹³ |
| 10 % by weight of A | 7·10¹⁰ | 9·10¹⁰ | 1·10¹¹ |
| 8 % by weight of B | 9·10¹⁰ | 8·10¹⁰ | 9·10¹⁰ |
| 10 % by weight of C | 2·10¹⁰ | 4·10¹⁰ | 6·10¹⁰ |
| 8 % by weight of D | 9·10¹⁰ | 1·10¹¹ | 1·10¹¹ |
| 10 % by weight of E | 2·10¹⁰ | 4·10¹⁰ | 5·10¹⁰ |

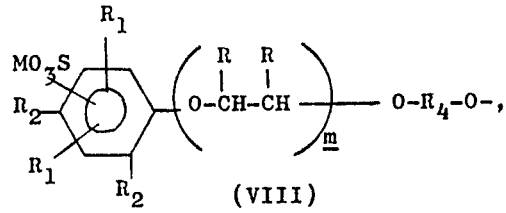

in which R, M and $m$ are defined as above; and A is

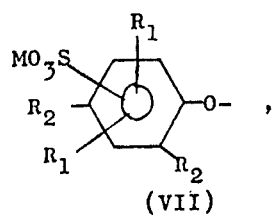

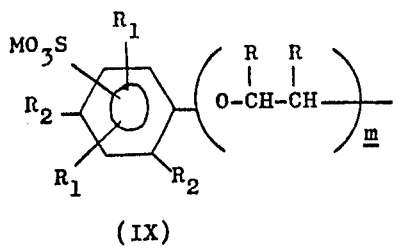

(VII)

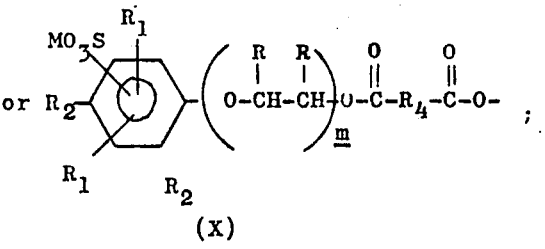

(VIII)

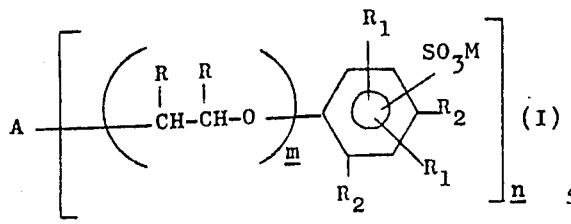

(IX)    or    (X)

We claim:

1. A polymer composition comprising an acrylonitrile polymer and as an antistatic agent therefor for 1 to 20 percent by weight of the total solids content of at least one compound having the formula $$A{-}{\left[{\left({\underset{\text{CH-CH-O}}{\overset{R\ R}{|\ |}}}\right)_{\underline{m}}}{-}{\left(\text{ring with } SO_3M, R_1, R_2\right)}\right]_{\underline{n}}} \quad (I)$$

in which $m$ is an integer of from 1 to 150;

M is an alkali metal, an ammonium radical, or an alkylammonium radical;

R is a hydrogen or methyl;

$R_1$ is hydrogen, lower alkyl radical with 1 to 6 carbon atoms, fluorine, chlorine, bromine or iodine;

$R_2$ is hydrogen, $-NH_2$, $-NO_2$, $-CN$, $-CF_3$, $-Cl$ or in which R, $R_1$, $R_2$, M and $m$ are defined as above; and $R_3$ is an alkyl radical with 1 to 30 carbon atoms, an aryl, alkylaryl or arylalkyl radical;

$R_4$ is an alkylene radical with 1 to 30 carbon atoms or an arylene radical; and $n$ is the number 1 or 2.

2. The composition of claim 1 in which said acrylonitrile polymer comprises at least 60 percent by weight of acrylonitrile and up to 40 percent by weight of at least one vinyl compound which is copolymerizable with acrylonitrile.

3. The composition of claim 2 in which said vinyl compound copolymerizable with acrylonitrile is an acrylic acid ester, an acrylic acid amide, a methacrylic acid ester, a methacrylic acid amide, vinyl chloride, vinylidene chloride or a mixture thereof.

4. The composition of claim 1 in which said antistatic agent has the formula

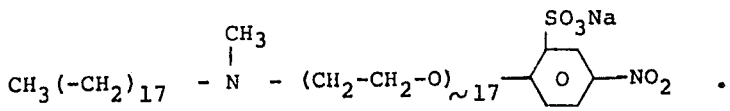

5. The composition of claim 1 in the form of a film.

6. The composition of claim 1 in the form of a filament.

* * * * *